(12) United States Patent
Outland

(10) Patent No.: US 10,460,265 B2
(45) Date of Patent: Oct. 29, 2019

(54) GLOBAL IT TRANSFORMATION

(75) Inventor: Rinsland N. Outland, Duluth, GA (US)

(73) Assignee: International Business Machines Corporation, Armonk, NY (US)

(*) Notice: Subject to any disclaimer, the term of this patent is extended or adjusted under 35 U.S.C. 154(b) by 3407 days.

(21) Appl. No.: 11/410,678

(22) Filed: Apr. 25, 2006

(65) Prior Publication Data

US 2007/0250368 A1 Oct. 25, 2007

(51) Int. Cl.
*G06Q 10/00* (2012.01)
*G06Q 10/06* (2012.01)
*G06F 8/10* (2018.01)
*G06Q 50/18* (2012.01)

(52) U.S. Cl.
CPC .............. *G06Q 10/06* (2013.01); *G06F 8/10* (2013.01); *G06Q 50/188* (2013.01)

(58) Field of Classification Search
CPC ......... G06Q 10/06; G06Q 50/188; G06F 8/10
USPC ............................................ 705/8, 7.12, 7.11
See application file for complete search history.

(56) References Cited

U.S. PATENT DOCUMENTS

| | | | | |
|---|---|---|---|---|
| 6,370,573 B1* | 4/2002 | Bowman-Amuah | ..... | G06F 8/20 709/223 |
| 6,405,364 B1* | 6/2002 | Bowman-Amuah | ..... | G06Q 10/06 717/101 |
| 6,952,688 B1* | 10/2005 | Goldman | ..... | G06N 5/022 706/45 |
| 2001/0052108 A1* | 12/2001 | Bowman-Amuah | ..... | G06Q 10/06 717/100 |
| 2003/0033229 A1* | 2/2003 | Keyes | ..... | G06Q 40/00 705/36 R |
| 2003/0083912 A1* | 5/2003 | Covington et al. | ..... | 705/7 |
| 2003/0236691 A1* | 12/2003 | Casatl et al. | ..... | 705/8 |
| 2004/0059611 A1* | 3/2004 | Kananghinis et al. | ..... | 705/7 |
| 2004/0093244 A1* | 5/2004 | Hatcher et al. | ..... | 705/7 |
| 2005/0043977 A1* | 2/2005 | Ahern et al. | ..... | 705/7 |
| 2005/0114829 A1* | 5/2005 | Robin et al. | ..... | 717/101 |
| 2005/0159969 A1* | 7/2005 | Sheppard | ..... | 705/1 |
| 2005/0278249 A1* | 12/2005 | Jones et al. | ..... | 705/38 |
| 2006/0235732 A1* | 10/2006 | Miller | ..... | G06Q 10/06 705/7.23 |

(Continued)

OTHER PUBLICATIONS

Systems of Systems Enterprise Systems Engineering, the Enterprise Architecture Management Framework, and Systems of Systems Cost Estimation. By Dr Paul Carlock and Jo Ann Lane.*

*Primary Examiner* — Jonathan G Sterrett
(74) *Attorney, Agent, or Firm* — Scully, Scott, Murphy & Presser, P.C.; Scott Dobson, Esq.

(57) ABSTRACT

Disclosed are a method of and system for providing a view of a transformation program. The method comprises the steps of providing an integrated and end-to-end set of processes, analytic tools, and reports that provide an information technology team with a comprehensive view of an information technology transformation; and using said set of processes, analytic tools and reports to provide a visibility to make objective business decisions about issues, including technology and activity and resource allocation. The preferred embodiment of the invention may be used in a number of specific situations. For example, the invention may be used in the implementation of IT investments, which are implemented in the course of an Annual Plan.

20 Claims, 34 Drawing Sheets

(56) References Cited

U.S. PATENT DOCUMENTS

2007/0250368 A1\* 10/2007 Outland ........................... 705/8

\* cited by examiner

Enterprise Program Management
Relationship of Responsibilities in BTMS Process

FIG. 9

Requirements Mgmt - Data Entry Form

◇ Save-Close

*Status:* *Draft*

▶ Requirement Data

\* Denotes required field

| Field | Value |
|---|---|
| Requirement Number: * | NEW |
| Requirement Title: * (Limited to 150 characters) | [ ] |
| Requirement Submitter: * | [ ▼] |
| Tie Line or Phone #: * | [ ▼] |
| Requirement Type: * | [ ▼] |
| Priority: * | [ ▼] |
| Geography: * | [ ▼] |
| Requirement Description: * (Limited to 1000 characters) | [ ] |
| Business Justification: | [ ] |
| Justification Remarks: (Limited to 500 characters) | [ ] |
| Attach Supporting Docs.: | [ ] |

— 90

- The submitter describes the new requirement in the available fields provided in this section.

- The fields notated with asterisks '*' are required to be filled in.

- The system automatically sets the status to indicate what stage in the process is the new requirement.

- In this case, a new requirement status is set to "Draft". The requirement must be saved before it is assigned a Requirement number.

FIG. 10

Requirements Mgmt – Data Entry (Populated Fields)

Save-Close  (Submit For Review)  Assign Requirement  Close Requirement
Date Created: 02/23/2004 12:01:33 AM
Author: Napoleon Outland/Atlanta/IBM Status: *Draft*

▼ Requirement Data

\* *denotes required field*

| | |
|---|---|
| Requirement Number: | 1073 |
| Requirement Title: * *(Limited to 150 characters)* | Governance Model complete... |
| Requirement Submitter: * | Napoleon Outland/Atlanta/IBM |
| Tie Line or Phone #: * | 546-1714 |
| Requirement Type: * | New Requirement |
| Priority: * | Critical to IBM Business |
| Geography: * | Worldwide |
| Requirement Description: * *(Limited to 1000 characters)* | Establish an Enterprise Management System to foster cross functional team collaboration for effective Program Management of interlock requirements, end-to-end support, metrics, and communications in support of IBM's Global IP Telephony Deployment |

- After the submitter saves the requirement, it is ready for OMT submission.

- The submitter must now have the document in re-edit mode to have the buttons appear on the action bar.

- When the "Submit for Review" button is pressed two things happen: the new requirement is assigned a new requirement number and the status is set to "Ready for OMT Review".

- On exit, the submitter is prompted to enter a brief description of what was done to the document. This description forms part of the audit trail.

Requirements Mgmt - Navigator, Views and Reports

FIG. 12

Requirements Mgmt - Assignment

Save-Close  Assign Requirement  Submit Plan for Signoff  Close Requirement

▶ OMT Requirement Assignment

OMT Review Date:* [16]

OMT Review Comments:*

120 — Assets/Solutions:* Hotelling, Cellular Endpoint, Hardphone, Softphone, Call Mgr, Conferencing Video, IP Transport, E2E Support, Softswitch, Global Dialer, Unified Messaging 122 — Technical Areas: Compliance, Performance, Strategy 124 — PDT Lead Assigned To:* Napoleon Outland/Atlanta/IBM Tie Line or Phone number: 545-1714

Target Completion:* 2004-01

- OTML brings the new requirement to the OMT for evaluation.
- The requirement is qualified by Asset(s) or Solution(s) and Technical Area
- The requirement is assigned to the best available resource to research and recommend a solution.

FIG. 13
Requirements Mgmt – Solution Definition

⇧ Save-Close Assign Requirement  Submit Plan for Signoff  Close Requirement

▶ Solution Definition

[ Create Action Plan ]

Action Plan — 132

Tasks | Risks | Issues | Dependencies | Team | References

| # | Task | Owner | Plan Start | Act. Start | Plan End | Act. End | |
|---|------|-------|------------|-----------|----------|----------|---|
| 1 | Define IP Communications Mgmt Structure | Stewart | 01/02/04 | 01/02/04 | 01/30/04 | 01/30/04 | Completed. |
| 2 | Define Global Voice & Video OMT Mgt Structure | Brighley - Primary Ostland - Support | 01/02/04 | 01/02/04 | 01/30/04 | 01/30/04 | Completed. |
| 3 | Define IPT Team roles and responsibilities | Ostland | 01/02/04 | 01/02/04 | 01/30/04 | 01/30/04 | Completed. |
| 4 | Integrate Reinvestment Governance Model | Reichlen - Primary | 01/02/04 | 01/02/04 | 03/31/04 | | |
| 5 | Establish Global Requirements Mgmt System | Ostland | 01/02/04 | 01/02/04 | 02/27/04 | | System is ready |
| 6 | Establish Global Program Mgmt System (PMOffice) | Ostland - Primary Reichlen - Secondary | 01/02/04 | 01/02/04 | 03/31/04 | | 1. GVT EMEA 2. GVT AP con 3. GVT America |
| 7 | Standardize Global Metrics Mgmt System | Ostland - Primary Reichlen - Secondary | 01/02/04 | 01/02/04 | 03/31/04 | | |
| 8 | Interlock to Infrastructure IMT | Reichlen - Primary | 01/02/04 | 01/02/04 | 02/27/04 | | 1. Investigating |

This is the protected text area of the form.

- The assigned resource develops and maintains an action plan to monitor and report progress of on-going activities while investigating a solution that meets the requirement. Click on the "Create Action Plan" button to load the mini-plan template.

- The scope of the action plan is limited to activities that will occur during the Pre-concept phase.

- The assignee must submit the action plan to the OMT for approval. This is accomplished by pressing the "Submit Plan for Signoff" button.

FIG. 18

A Project Milestone Document

FIG. 20

An Issue or Dependency Document

⌶Close Edit

| IBM. Global Voice & Video Rqmnts Mgmnt System | Issue/Dependency Form |
|---|---|

| Geo | US *Required |
|---|---|
| Project Name | IP Audio Conferencing *Required |
| Sub-project Name: | End User Migration *Required |
| ID Number | NOUD-6586ZD |
| Issue or Dependency | Solution (Avaya/Spectel and Rendezvous) capabilities to rapidly provision and manage end user accounts *Required |
| Contact | Mike Polovich *Required |
| Date Opened | [16] *Required |
| Reporting Status for this period | Open *Required |
| Reporting Color Code for this period | |
| Required Action/Comments | IBM and Avaya/Spectel Subject Matter Expects will define process |
| Attachments | |

[Click to return to PM Overview]

Risks Mgmt View

FIG. 22
A Risk Document

Close | Edit

| IBM. Global Voice & Video Rqmnts Mgmnt System | Risk Identification Form |

| | |
|---|---|
| Geo | US *Required |
| Project Name | IP Audio Conferencing *Required |
| Sub-project Name: | SDC Plan and Implentation *Required |
| ID Number | NOUD-6520BK |
| Risk Identified | Platform delivered on new technology, first time implementation *Required |
| Risk Location | *Required |
| Risk Statement Condition | *Required |
| Risk Statement Consequence | *Required |
| Risk Category | *Required |
| Risk Probability | *Required |
| Impact on time scale | *Required |
| Impact on budget | *Required |
| Impact on quality / customer sat | *Required |
| Risk Exposure | 0 *Required |
| Proposed Mitigation | *Required |
| Total Votes | *Required |
| Attachments | |

Click to return to PM Overview

FIG. 23

Executive Summary

- 29,951 IPT endpts installed as of Oct. 26, 2004
  - 28,354 hardphones, 1,597 softphones
  - US: 4,023 endpts
  - Canada: 7,056 endpts
  - AP: 8,841 endpts
  - EMEA: 10,031 endpts

- 3,885 endpts added this month (Oct., 2004)
  - US: 647 endpts (1 site in Hazelwood MO)
  - Canada: 45 endpts (1 site in Shaw Calgary)
  - AP: 2,864 endpts (1 site in Toyosu Japan- 1700 endpts, Taiwan SDC- 300 endpts, 10 sites expansion in India 638 endpts, addt'l MACs)
  - EMEA: 329 endpts (MACs and Softphones expansion across countries)

- 2004 Year Plan Status
  - Quarter thru current month - 3,885 endpts
  - Installed thru current month - 29,951 endpts
  - FY Installed outlook - 40,700 endpts
  - Rest of year installed forecast is 10,749 endpts

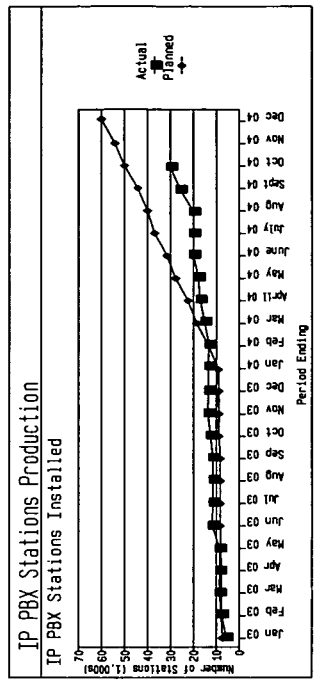

FIG. 24

US IP LAN Telephony - 2004 Plan Status

| Summary Status | |
|---|---|
| Project Definition: Implement US IP Telephony Endpoints. Sunset PBX's. | |
| Project Status: We are working on an SOW and costing model for second Callmanager Cluster in Pok NY SDC. SOW is completed. Currently preparing work products for plan OCP. | |
| Financial Status: | |

Major Milestones — 240

| # | Target | Plan Committed? | Outlook |
|---|---|---|---|
| | | | Completed |
| | | | Completed |
| | | | Completed |
| | | | Completed |
| | | | Completed |

| # | SDC | Target | Plan Committed? | Outlook |
|---|---|---|---|---|
| | | | | Completed |
| | | | | TBD |

Issues & Dependencies — 242

| # | Contact | Outlook |
|---|---|---|
| | | Completed 18 May 2004 |
| | | Completed - Equipment Arrived 15 May 2004 |
| | | 15 Jun 2004 |

Click to return to PM Overview

FIG. 28

Transformation Report Detail (1 of 7)

| Submit MACs ☑ Edit | | |
|---|---|---|
| IBM. Global Voice & Video Rqmnts Mgmnt System | Location Deployment Form | |

| Location Information: | IP LAN Plan | IP WAN Plan | WAN Readiness | LAN Readiness |
|---|---|---|---|---|

▶ Location Information

*denotes required field*

| Geo* Americas | Region* LATIN AMERICA | Site Number (Unique to this database) 1212 | Site Tier Classification 2 |
|---|---|---|---|
| Country* Brazil | State or Province Sao Paulo | City or Town or Project Hortolandia | Location/Address Rodovia SP-101 Campinas-Monte Mor- Km 09 |
| Work Location Code of this site BRMM | Site Population 2000+ — 282 | Facility Type(s) Multiple  284 — | Business Units at this location AMS, BCS, IGS, MGD |
| Number of PBX Ports (Lines & Trunks) | Is this site a target for consolidation No | Current Telephony Configuration TDM | Current Telephony Equipment Avaya |

FIG. 29

Transformation Report Detail (2 of 7)

Submit MACs  Edit

| Location Information | IP LAN Plan | IP WAN Plan | WAN Readiness | LAN Readiness |
| --- | --- | --- | --- | --- |
| | | | | |
| | | | | |

*Hortolandia, Brazil, Americas*

\* denotes required field to exit Plan Phase
\# denotes required field to move into Production Phase

▼ CALL SERVER CONTROL

292 — Planned IP Telephony Configuration\*
Skinny

294 — Planned IP Telephony Configuration #
Skinny

296 — Planned Call Server Control Vendor\*
Cisco

298 — Installed Call Server Control Vendor #
Cisco

300 — Planned Call Server Configuration\*
Remote to SDC

302 — Installed Call Server Configuration #
Remote to SDC

Planned Server Cluster Location \*
Hortolandia

Server Cluster Location #
Hortolandia

FIG. 30

Transformation Report Detail (3 of 7)

▼ IP ENDPOINTS

Type of IP Phones to be
Installed at this site*
Hardphones Only

306 — Planned IP Hard Phones
Vendor *Cisco

Planned # IP Hardphones
on LAN *250 — 310

Planned IP Soft Phones
Vendor

Planned # IP Softphones on
LAN  0

308 — Installed IP Hard Phones
Vendor #Cisco

Installed # IP Hardphones
on LAN #330 — 312

Installed IP Soft Phones
Vendor

Installed # IP Softphones
on LAN  0

Planned Total # IP Phones
on LAN
250

Planned # TDM Phones on
LAN

Planned # Enabled IP
Telephony Users

Planned Usage *General
Telephony

IP Hardphones - MAC
626

IP Softphones - MACS
34

Installed Total # IP
Endpoints on LAN
990

Actual # TDM Phones on
LAN

Actual # Enabled IP
Telephony Users

Actual Usage #General
Telephony

FIG. 31

Transformation Report Detail (4 of 7)

Submit MACs  Edit

▼ SUNSET LEGACY PLAN

Planned Number PBXs to be sunset 0

Actual Number PBXs sunset

Date planned to sunset

Date sunset was completed

Is Plan Committed?

↖ 314

▼ TRANSFORMATION PLAN

Any plan to transform this site? Yes

Has transformation been completed?

What is the current phase of the transformation project?
*
Production

Date planned to complete transformation*
08/01/2005

Date transformation was completed #
08/01/2005

What is the current status of the transformation project?
*
Green

Is Plan Committed? *
Yes

Transformation Report Detail (5 of 7)

Submit MACs  Edit

▼ BTMS/BTOP Work products

Workproducts

| | Document | Mandatory? | Reference to Sample Template | Reference to Specify link to teamro found, or reference to is attached, or attach |
|---|---|---|---|---|
| 1 | Business Case | Yes | | |
| 2 | Requirement and Sizing Document | Yes | | |
| 3 | Architecture Design Document (High Level Design, NDDs, etc.) | Yes | | |
| 4 | Security Approval | Yes | | |
| 5 | Cut-over to Production Checklist | Yes | | |
| 6 | Exit Criteria Checklist | Yes | | |
| 7 | Integrated Project Plan | Yes | | |
| 8 | Dependencies | Yes | | |
| 9 | Risks Assessment | Yes | | |
| 10 | Lessons Learned | No | | |
| 11 | Link to CMAD Record | Yes (if exception) | | |

Transformation Report Detail (6 of 7)

Submit MACs ☑ Edit

▼ Plan DCP Exit Signoffs

▼ Project Manager Signoff

Project Manager          Type of transformation to    Signoff Date ← 332
Alfredo Sala/Peru/IBM    be completed at this site    08/13/2005
                         Greenfield ▼ Technology Deployment Approver Technology Deployment    Type of Approval             Signoff Date      Comments
Approver                 Accepted                     08/13/2005
Alfredo Sala/Peru/IBM ▼ Global Voice & Video OMT Approver Global Voice & Video OMT Type of Approval             Signoff Date      Comments
Approver Harry           Accepted                     08/27/2005
Reichlen/Waltham/IBM Additional comments about the transformation project you want reported for this period

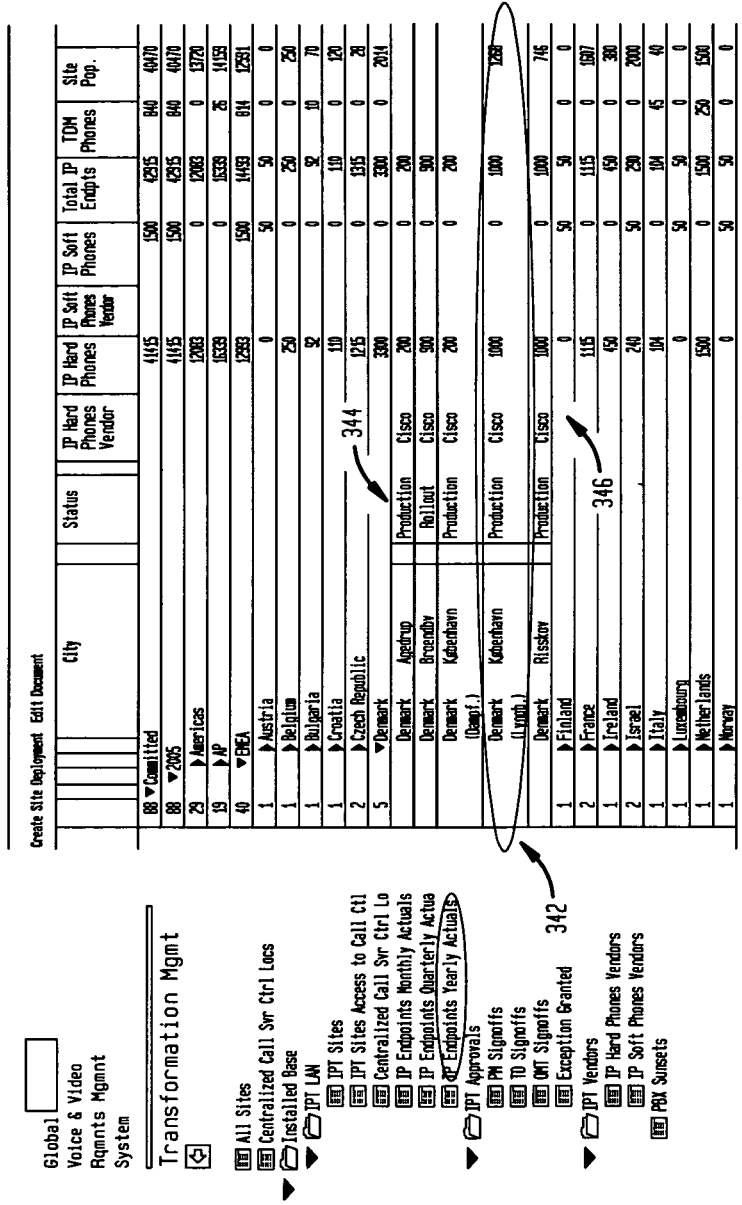
FIG. 34 Transformation Yearly Report (7 of 7)

GLOBAL IT TRANSFORMATION

BACKGROUND OF THE INVENTION

Field of the Invention

This invention generally relates to business transformation management tools. More specifically, the invention relates to a method and system that facilitates full team participation in Information Technology investment and Return On Investment planning, execution, monitoring and reporting.

Background Art

Today, Information Technology (IT) executives make the decision to invest in an IT Transformation project based on compelling business case and a key topic for inclusion in a business case is Return On Investment (ROI). Essential elements of ROI are: Cost Savings, Cost Avoidance, Expense Reduction/Elimination, Revenue Generation, Productivity Gains, Sunset Plans, Transformation Plan, etc. Generally, the business team creates business case and a Project Development Team (PDT) is assembled to manage the IT Transformation project through its life cycle. It is the responsibility of the PDT to put in place a process to demonstrate ROI. While there exist Project Management software tools, the PDT can employ to collaboratively define, monitor and report the project progress, nothing similar exists for the PDT to collaboratively monitor, measure, and repot against the ROI. They must rely on manual processes, multiple analytic non-integrated tools and expert opinions to obtain data in support of ROI. This is time consuming, requires advice of technical resources to compile and analyze the data, and is prone to errors.

SUMMARY OF THE INVENTION

An object of this invention is to enable IT transformation teams to manage their IT investments more effectively.

Another object of the present invention is to facilitate full team participation in IT investments and ROI planning, execution, monitoring and reporting.

A further object of the invention is to monitor an IT transformation without relying on static software tools for information gathering, analysis and dissemination.

These and other objectives are attained with a method of and system for providing a view of a transformation program. The method comprises the steps of providing an integrated and end-to-end set of processes, analytic tools, and reports that provide an information technology team with a comprehensive view of an information technology transformation; and using said set of processes, analytic tools and reports to provide a visibility to make objective business decisions about issues, including technology and activity and resource allocation.

The preferred embodiment of the invention, described below in detail, may be used in a number of specific situations. For example, the invention may be used in the implementation of IT investments, which are implemented in the course of an Annual Plan. More specifically, as an example, during the Annual Plan process, the business team negotiates with the PDT about IT investments and ROI targets for the new year. Subsequently, the PDT collaborates with the Services Provider(s) to plan out the detail IT investment allocations and ROI forecasts in support of the Annual Plan. The details of this plan articulate month-to-month investments and ROI targets. The technology deployment teams in the various geographies are involved to provide insight of how they will align with the Annual Plan.

In the new year following the planning, the PDT collaborates with geography technology deployment teams on a regular basis to drive project executions in support of the global plan. The integrated and end-to-end set of processes and analytic tools that comprise the invention are used across the business, PDT, and technology deployment teams for effective collaboration, information sharing, and decision-making. The areas of interest supported with the invention are: Requirements and Change Management, Executive/Business Level Project Reporting, Transformation Planning/Monitoring/Tracking/Measuring/Reporting, Sunset Activities, Cost Savings, Cost Avoidance, and Expense Reduction/Elimination. The visibility to this level of information across the geographies empowers the PDT to manage the enterprise IT investments more effectively.

Project executives, project managers and other business and technical resources across the geographies may utilize this invention to drive their respective team activities and report their efforts to the global team. The invention provides capabilities at the geography level to facilitate full team participation in IT investment and ROI planning, execution, monitoring, and reporting. Using this invention, the geography teams provide monthly updates to the PDT and this is measured against the Annual Plan forecasts and targets. The present invention eliminates the team reliance on static tools like Microsoft Excel and PowerPoint for information gathering, analysis, and dissemination. Such tools require significant investment of time and resources to compile and analyze the data, and are prone to errors. Furthermore, the files they produce have to be distributed across the team, and if not carefully managed, could lead to incorrect reporting at the global level. This invention, in contrast, provides needed information at the click of a button to business executives and stakeholders about IT Transformation progress, IT investments and ROI.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 8-14 illustrate various display screens that may be shown to a user in the course of the Requirements Management Process.

FIGS. 16-24 illustrate display screens that may be shown as part of the Project Management Engagement Process.

FIGS. 26-34 show screens that may be displayed during the Transformation Management Engagement Process.

DETAILED DESCRIPTION OF THE PREFERRED EMBODIMENTS

Changes or transformations in a business or the operation of a business can be quite complex and involve many people and a huge amount of equipment at numerous sites located over a wide geographical area or even the whole world. Computer software is often used to help plan for and manage such transformations.

Figure 1:
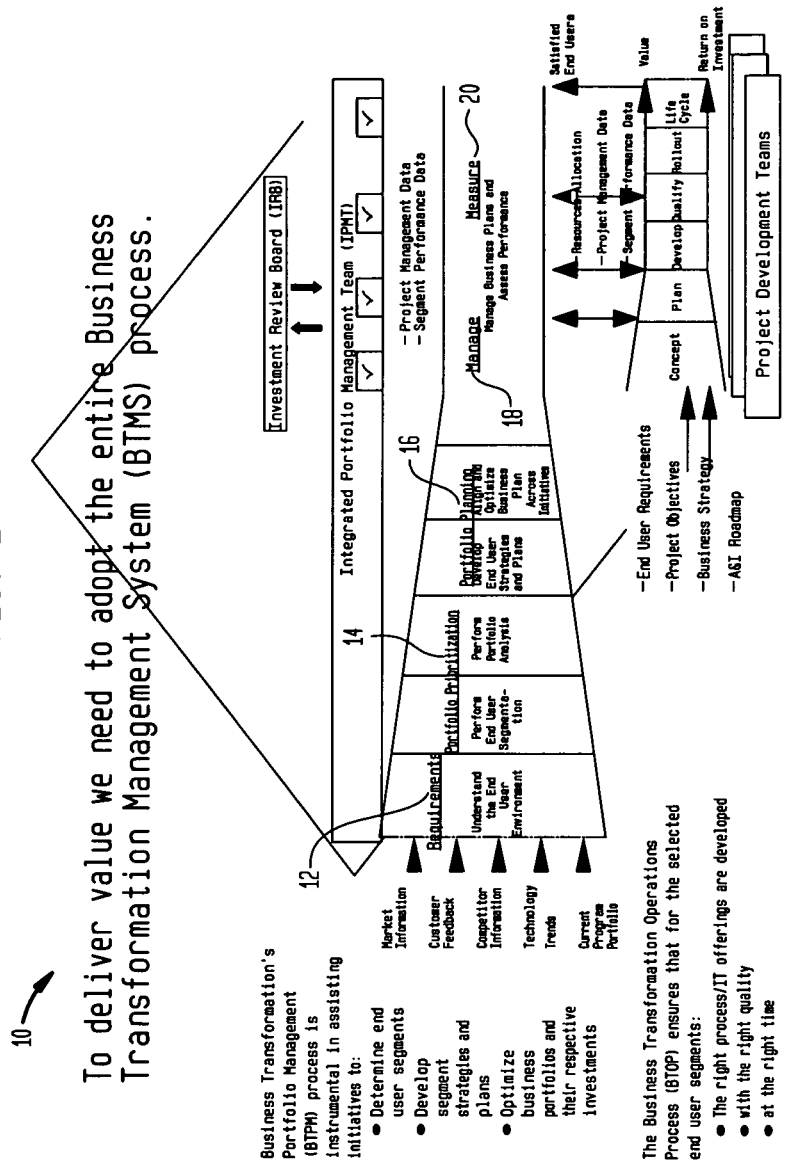
FIG. 1 depicts a Business Transformation Management System (BTMS) process.
Figure 2:
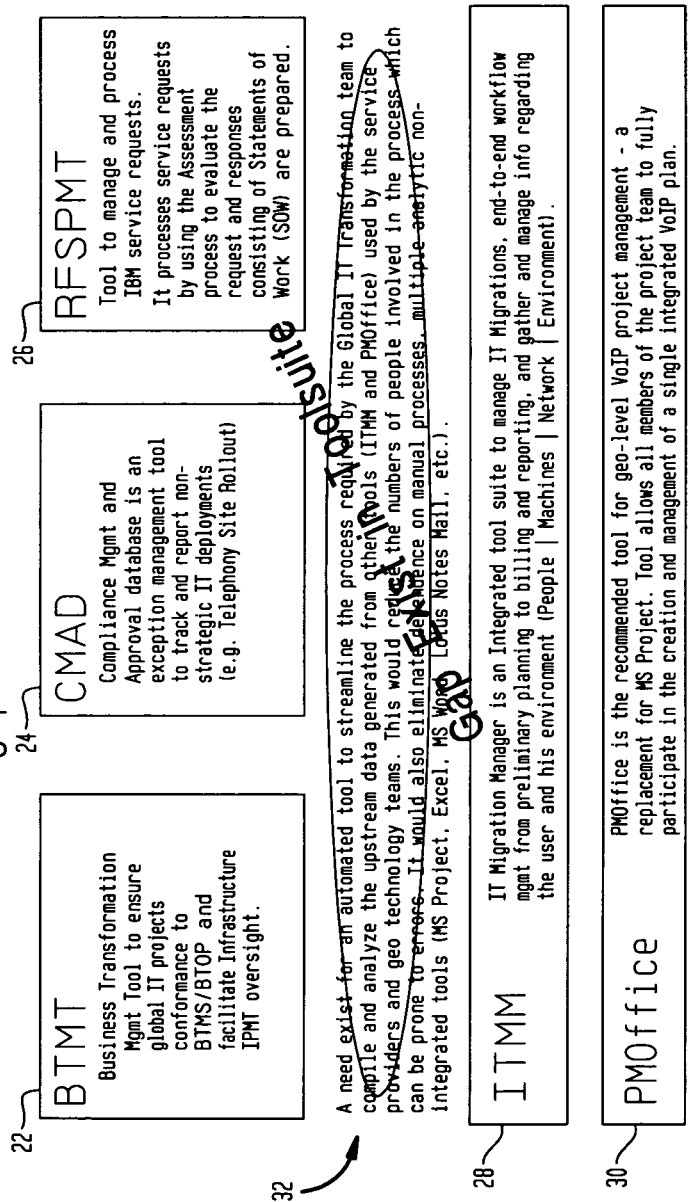
FIG. 2 illustrates a current BTMS toolsuite.

FIG. 1 illustrates a process, referred to as the Business Transformation Management System (BTMS) process 10, and FIG. 2 identifies software tools in the BTMS toolsuite. With reference to FIG. 1, the BTMS process includes a Business Transformation's Portfolio Management (BTPM) process, and a Business Transformation Operations Process (BTOP). Generally, the BTPM assists initiatives to determine end user segments, develop segment strategies and plans, and optimize business portfolios and their respective investments. The BTOP is used to ensure that for the selected end user segments, the right process/IT offerings are developed, with the right quality and at the right time.

The BTMS process includes several phases or stages, including a Requirements phase 12, a Portfolio Prioritization phase 14, a Portfolio planning phase 16, a Manage phase 18, and a Measure phase 20. In the Requirements phase, an understanding is developed of the end user environments; and in the Portfolio Prioritization phase, end user segmentation and portfolio analysis is performed. Then, in the Portfolio Planning phase, end user strategies and plans are developed, and the business plan is aligned and optimized across initiatives. The Manage phase is the part of the process in which the business plans are managed; and in the Measuring phase, the performance of the business plans are assessed.

As illustrated in FIG. 2, the BTMS toolsuite includes several specific tools, including those referred to as BTMT 22, CMAD 24, RFSPMT 26, ITMM 28 and PMOffice 30. While these tools provide considerable support, there is, as indicated at 32 in FIG. 2, a gap in the toolsuite.

More specifically, the BTMT, or Business Transformation Management Tool, ensures that global IT projects conform to BTMS/BTOP and facilitates infrastructure IPMT oversight. The CMAD, or Compliance Management and Approval database, is an exception management tool to track and report non-strategic IT deployment such as telephony site rollout. The RFSPMT is used to manage and process service requests. This tool processes service requests by using an Assessment process to evaluate the request, and prepares responses consisting of Statements of Work (SOW).

The ITMM, or IT Migration Manager, is an integrated tool suite used to manage IT migration, end-to-end workflow management from preliminary planning to billing and reporting, and information regarding the user and his environment. PMOffice is a tool for geo-level voice-over-Internet Protocol (VoIP) management, and this tool allows all members of the project team to fully participate in the creation and management of a single integrated VoIP plan.

The tools referenced in FIG. 2 can be used to collaboratively define, monitor, and report the progress of a project. There is, nonetheless, a gap in the BTMS Toolsuite. In particular, a need exists for an automated tool to streamline the process required by the Global IT Transformation team to compile and analyze the upstream data generated from the other tools, such as ITMM and PMOffice, used by the service providers and the geo technology teams. This would reduce the number of people involved in the process, and, in this way, reduce errors. It would also eliminate dependence on manual processes and on multiple analytic non-integrated tools.

The present invention addresses this need. The present invention may be used to deliver an integrated and end-to-end set of processes, analytic tools, and reports that provide the Global IT team with a comprehensive view of the Global IT Transformation programs and projects. This invention may also be used to streamline the process required to compile and analyze the data, thereby reducing the number of people involved in the process, which reduces the number of errors. In addition, the invention may be used to eliminate the dependence on manual processes and multiple analytic non-integrated tools, and the invention provides the visibility needed to make objective business decisions about issues such as technology, and activity and resource allocation. This level of insight empowers IT Transformation teams to manage their IT investments more effectively.

By providing the above features, the invention fills the gap in the BTMS integrated toolsuite. The preferred embodiment of the invention is a Global Voice and Video Requirements Management System (V2RMS) and is a collaboration tool for Global team to make decisions about projects. It supports cross teams interaction in Requirements Management, Global Project Planning and Monitoring and Reporting. The invention also allows for quick access to high-level geo project information.

Figure 3:
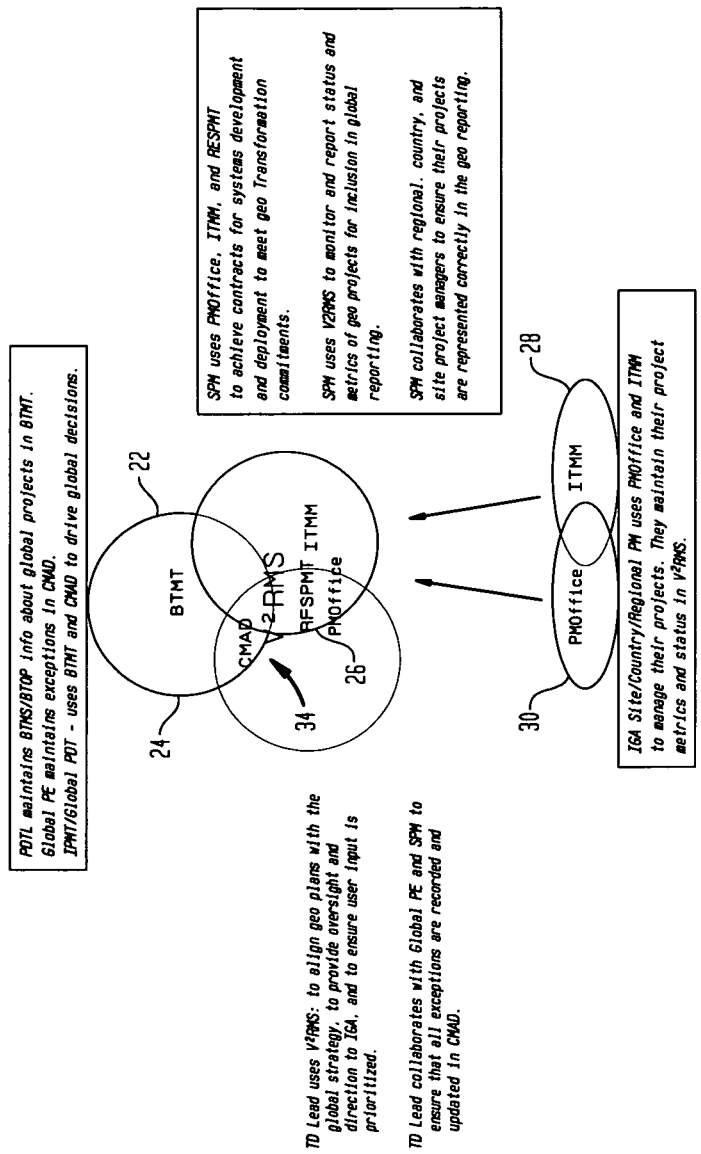
FIGS. 3 and 4 illustrate the relationship of responsibilities in the BTMS process when a preferred embodiment, referred to as V2RMS, of the present invention is included.
Figure 4:
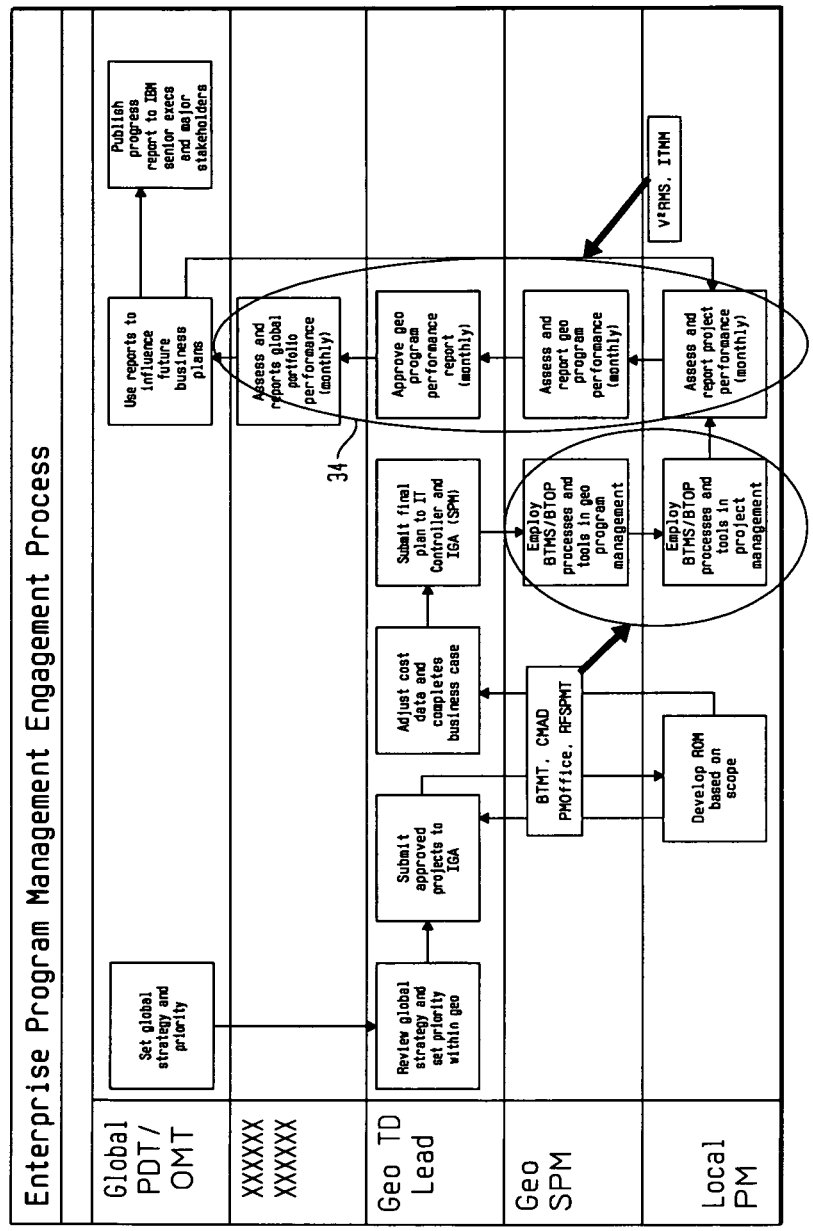

FIGS. 3 and 4 illustrate the relationship of responsibilities in the BTMS Process when V2RMS, referenced at 34, is included. The Project Development Team Leader (PDTL) maintains BTMS/BTOP information about global projects in BTMT. The Global Project Executive (PE) maintains exceptions in CMAD, and the IPMT/Global Project Development Team (PDT) uses BTMT and CMAD to drive global decisions.

The Technology Deployment (TD) Lead uses V2RMS to align geo plans with the global strategy, to provide oversight and direction to the Global Account (IGA), and to ensure that user input is prioritized. The TD Lead also collaborates with the Global PE and the SPM to ensure that all exceptions are recorded and updated in CMAD.

The SM uses PMOffice, ITMM, and RFSPMT to achieve contracts for systems development and deployment to meet geo transformation commitments. The SPM uses V2RMS to monitor and report status and metrics of geo projects for inclusion in global reporting. Also, the SPM collaborates with regional, country, and site project managers to ensure that their projects are represented correctly in the geo reporting. The IGA Site/Country/Regional PM uses PMOffice and ITMM to manage their projects, and they maintain their project metrics and status in V2RMS.

The following discussion, given with reference to FIGS. 5-34, describes, as an example, one embodiment of the present invention. As will be understood by those of ordinary skill in the art, numerous specific details may be added, deleted or changed without departing from the scope of the invention. Also, as will be appreciated by those of ordinary skill in the art, the present invention is implemented using a computer system or network to communicate between persons and to store data, and any suitable computer system or network may be used.

In addition, during the implementation of the invention, forms may be presented to a user on a computer display screen, and the user can input information directly onto these forms. Any suitable procedures may be used to present these forms to a user and to enable the user to input data to the computer or network. Appropriate procedures are well known in the art and it is unnecessary to describe these procedures herein in detail. Other suitable mechanisms may also be employed to input and maintain the desired information.

Figure 5:
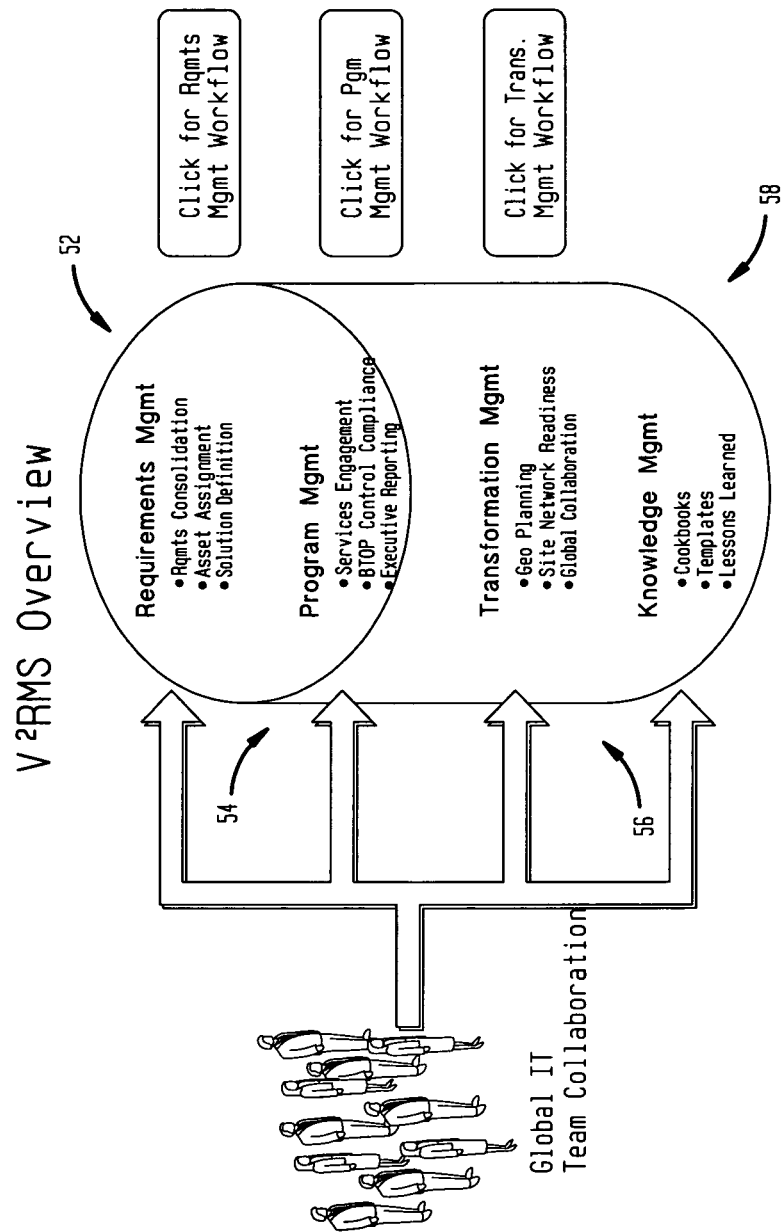
FIG. 5 presents an overview of V2RMS.

FIG. 5 present an overview of V2RMS. Generally, V2RMS includes four sub-processes, referred to as Requirements Management 52, Program Management 54, Transformation Management 56, and Knowledge Management 58. Generally, Requirements Management 52 is used to consolidate requirements, to assign assets, and to define solutions; and Program Management 54 is used for services engagement, BTOP control compliance, and executive reporting. The Transformation Management sub-process 56 is used for geo planning, site network readiness, and global collaboration; and the Knowledge Management sub-process 58 provides instructions, referred to as cookbooks and templates and retained information, referred to as lessons learned.

Figure 6:
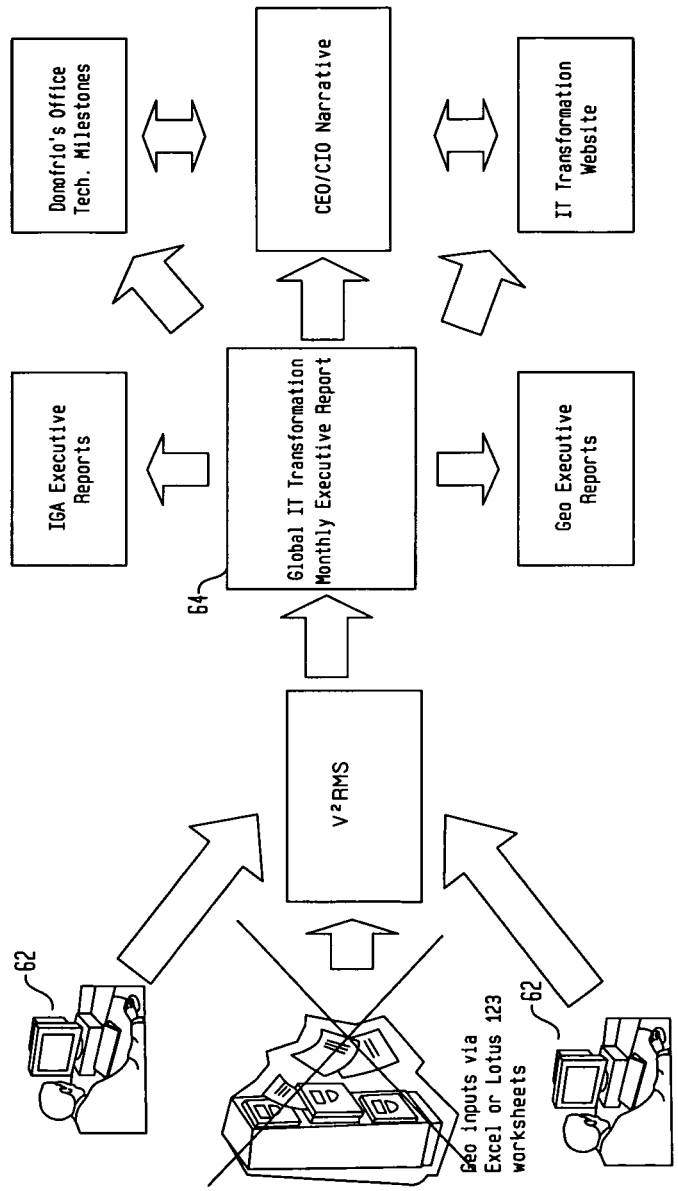
FIG. 6 provides an overview of the reporting capability of V2RMS.

An important feature of the preferred V2RMS is its reporting capability, and FIG. 6 provides an overview of this capability. Generally, V2RMS receives input data from users 62 and prepares monthly executive reports 64 using that data. These monthly executive reports, in turn, can be used to prepare various other reports, including Geo executive reports and IGA executive reports. Specific processes and forms are used to input the data into V2RMS, and these forms and processes help to present, maintain and update that information in a way that allows this information, or parts of the information, to be easily presented in different ways to the different people who are involved in supervising, managing and measuring a particular transformation.

Various metrics may be in the V2RMS Reports. For instance, these reports may be progress reports on a current year plan, and the reports may include change request management, and identify projects, issues, dependencies, and risks. IT Transformation Progress Reports may also be provided that compare actual performance of a plan versus forecasts, identify new deployments or rollouts, identify an inventory base, and list operations management procedures.

Figure 7:
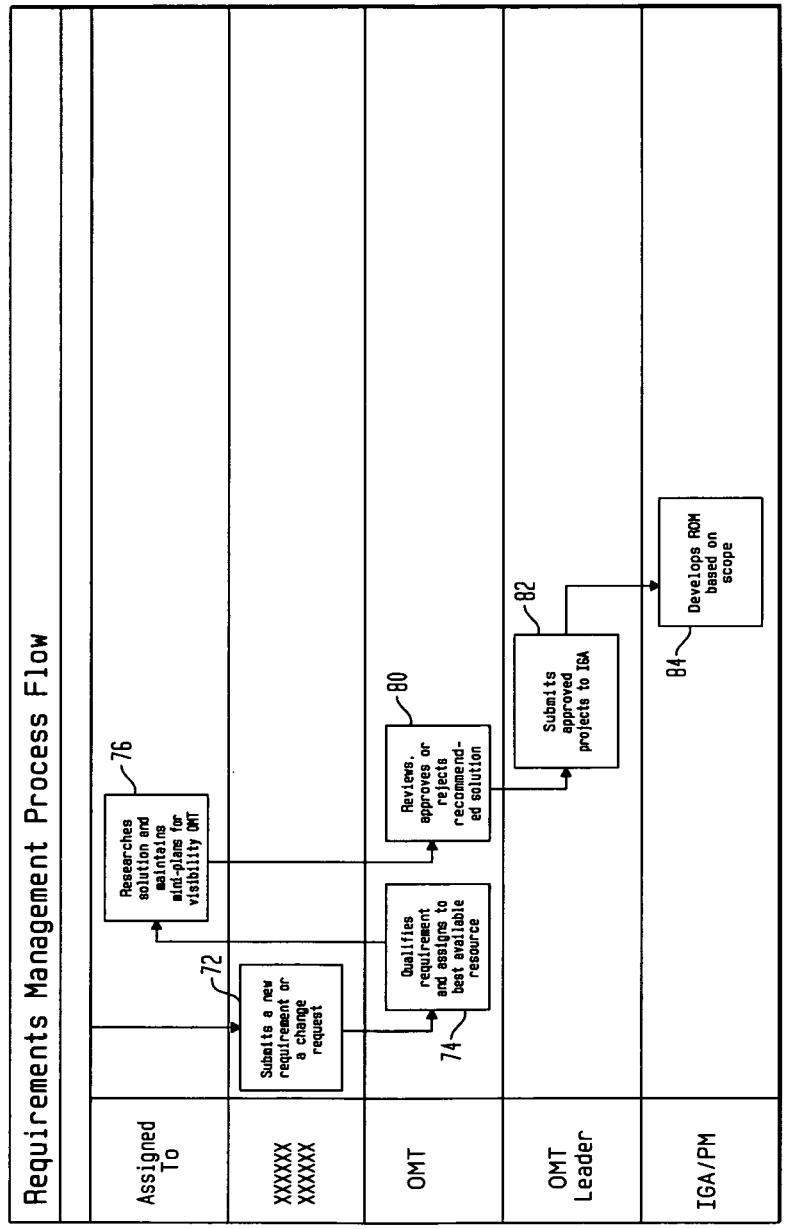
FIG. 7 illustrates the flow of the Requirements Management Process of V2RMS.

FIG. 7 illustrates the flow of the Requirements Management Sub-Process. In this flow, at step 72, a new requirement or a change request is submitted; and at step 74, the OMT qualifies the requirement and assigns it to the best available resource. At step 76, the resource to which the requirement is assigned researches a solution and maintains a mini plan for visibility to the OMT. The OMT, at step 80, reviews and approves or rejects the recommended solution. If approved, then at step 82, the OMT leader submits the approved project to the IGA; and at step 84, the IGA PM develops a ROM based on the scope of the approved projects.

Figure 8:
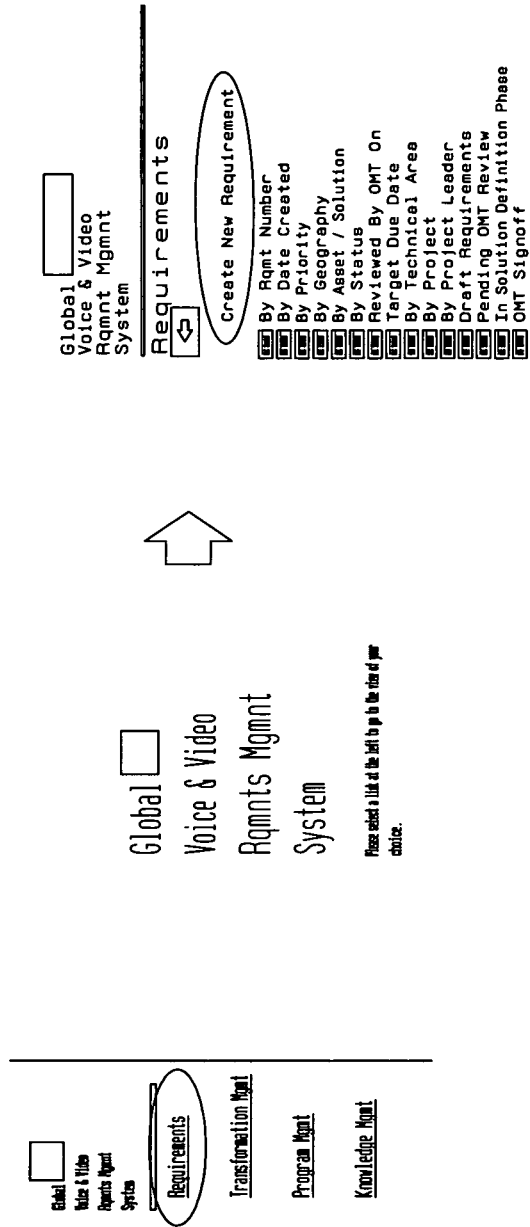

FIGS. 8-14 illustrate various display screens that may be shown to a user in the course of the Requirements Management sub-process. In particular, FIG. 8 shows a screen that may be used to begin the procedure to create a new requirement; and when this procedure is begun, the screen of FIG. 9 may be shown. This screen at 90 prompts the user to give various data items, such as a title, a description, and a business justification. As indicated in the Figure, this sub-process may require that certain data items be provided.

Figure 11:
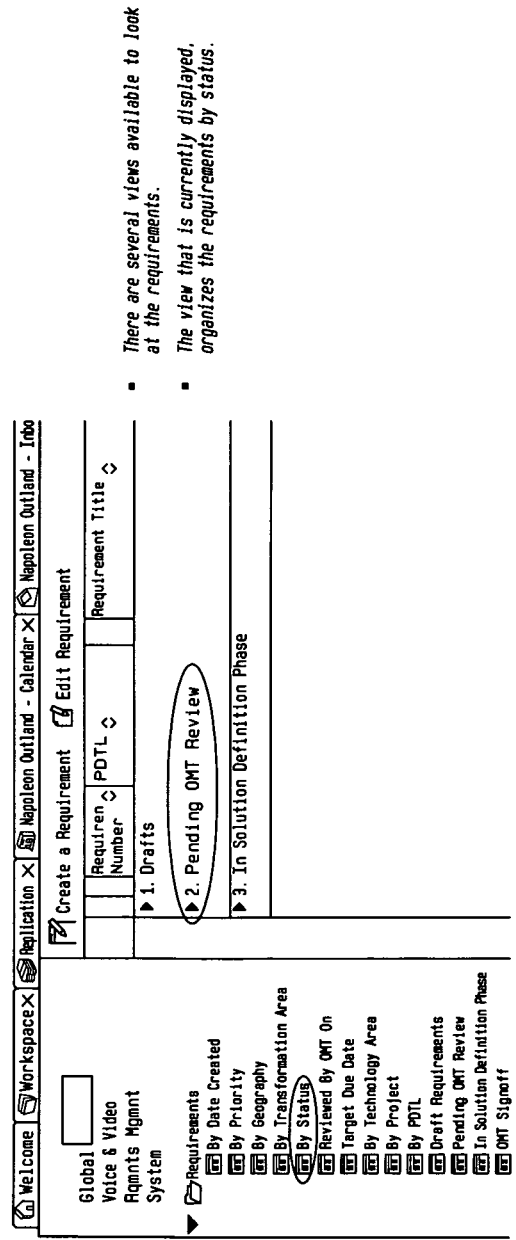

FIG. 10 shows a completed data entry page. Once the document is saved, the document is ready to be submitted to the OMT, and the displayed screen may at 100 prompt such submission. Preferably, as indicated in FIG. 10, when the information is submitted, the new requirement is assigned a new request number, and the status of the request is set to "Ready for OMT Review." In addition, preferably, the submitter is prompted to enter a brief description of what was done to the document, and this description may be used to form part of an audit trail. Preferably, several views are available to look at the requirements organized or listed in different ways; and, for example, FIG. 11 shows a view in which the requirements are organized by status.

FIG. 12 shows a display screen that may be used when the OMT leader (OMTL) brings the new requirement to the OMT for evaluation. As indicated in the Figure, preferably, the requirement is qualified by Asset(s) or Solution(s) 120 and Technical area 122, and the requirement is assigned 124 to the best available resource to research and recommend a solution.

FIG. 13 illustrates a screen that may be used to define a solution to a requirement. Using this screen, the resource, to which the requirement has been assigned, develops and maintains an action plan 132 to monitor and report progress of on-going activities while investigating a solution that meets the requirement. Also, templates may be provided and accessed at this stage of the process to help develop the action plan. Once an action plan is developed, it is submitted to the OMT for approval.

Figure 14:
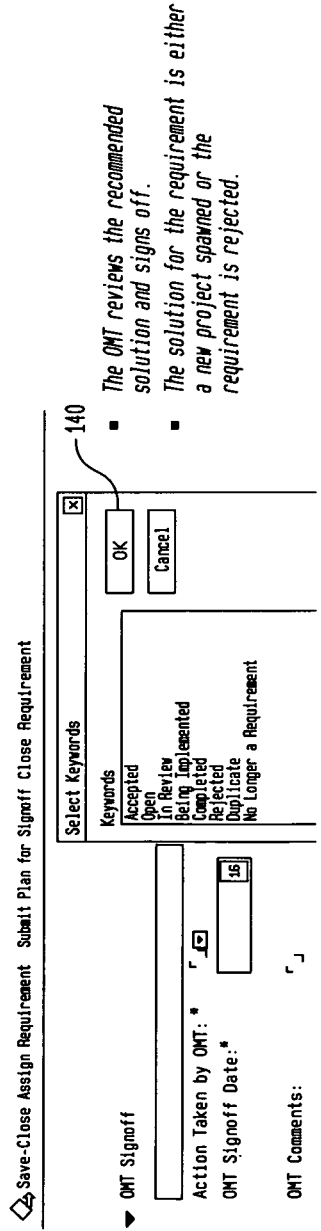

FIG. 14 shows a display screen that may be used to provide this approval. This may be done by simply indicating, via the displayed screen at 140, that the plan is approved or accepted. With the preferred process of this inventions either the action plan is accepted, in which case, a new project is begun, or the requirement is rejected.

Figure 15:
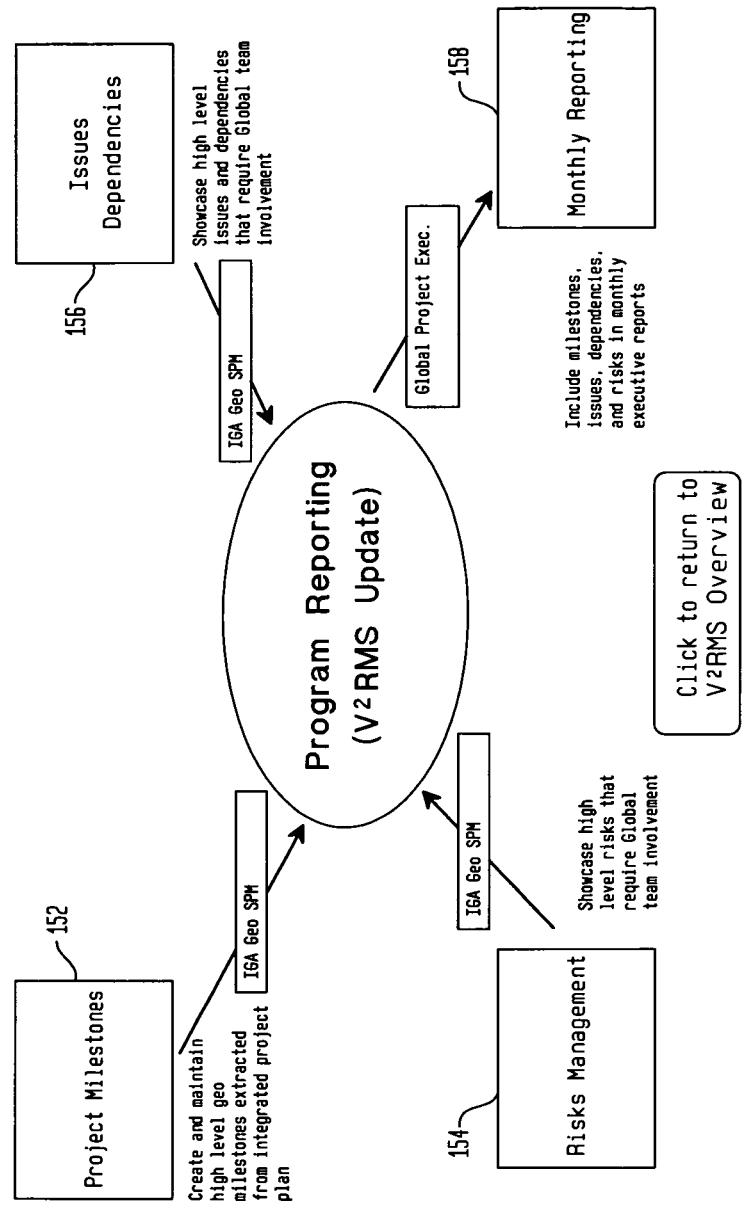
FIG. 15 generally illustrates the Program Management Engagement Process of V2RMS.

FIG. 15 generally illustrates the Program Management Engagement Process. Generally, this process includes four sub-processes, referred to as Project Milestones 152, Risks Management 154, Issues Dependencies 156, and Monthly Reporting 158. The Project Milestones sub-process 152 creates and maintains high-level geo milestones extracted from the integrated project plan, and the Risks Management sub-process 154 identifies high-level risks that require Global team involvement. Issues Dependencies 156 identifies high-level issues and dependencies that require global team involvement, and Monthly Reporting 158 is used to issue monthly executive reports that, for example, may identify milestones, issues, dependencies, and risks.

Figure 16:
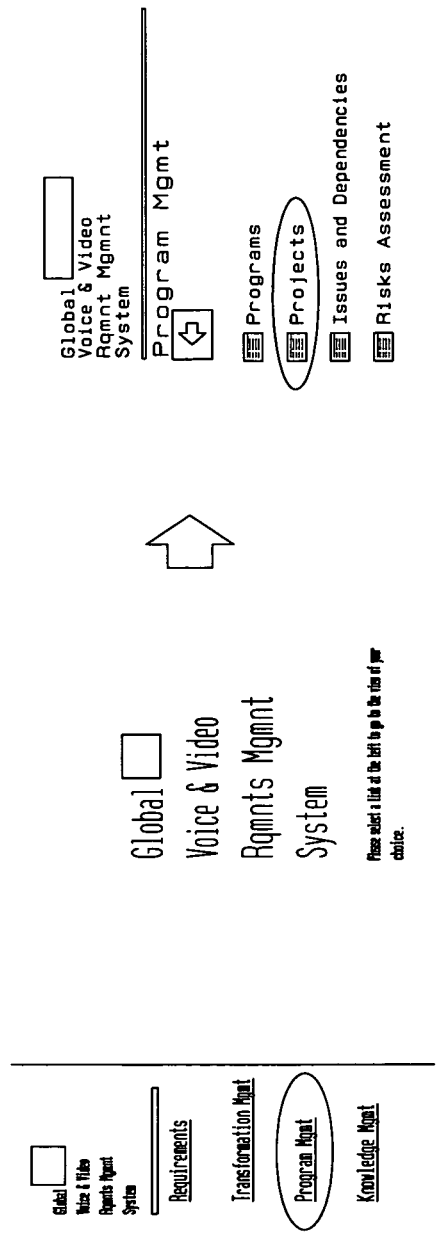
Figure 17:
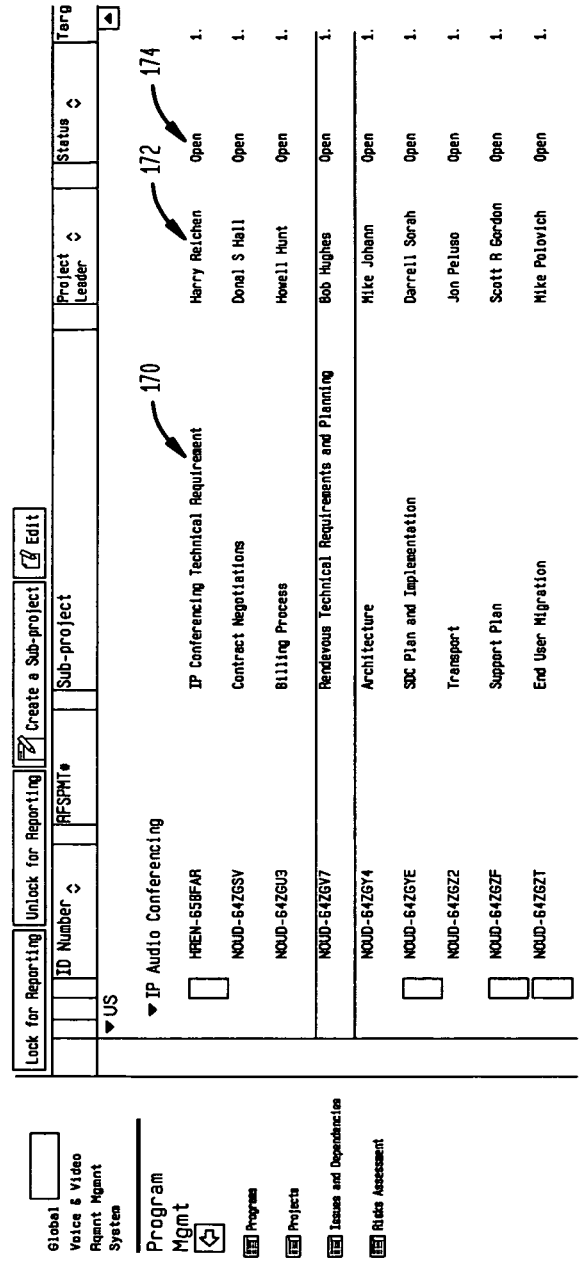
Figure 18:
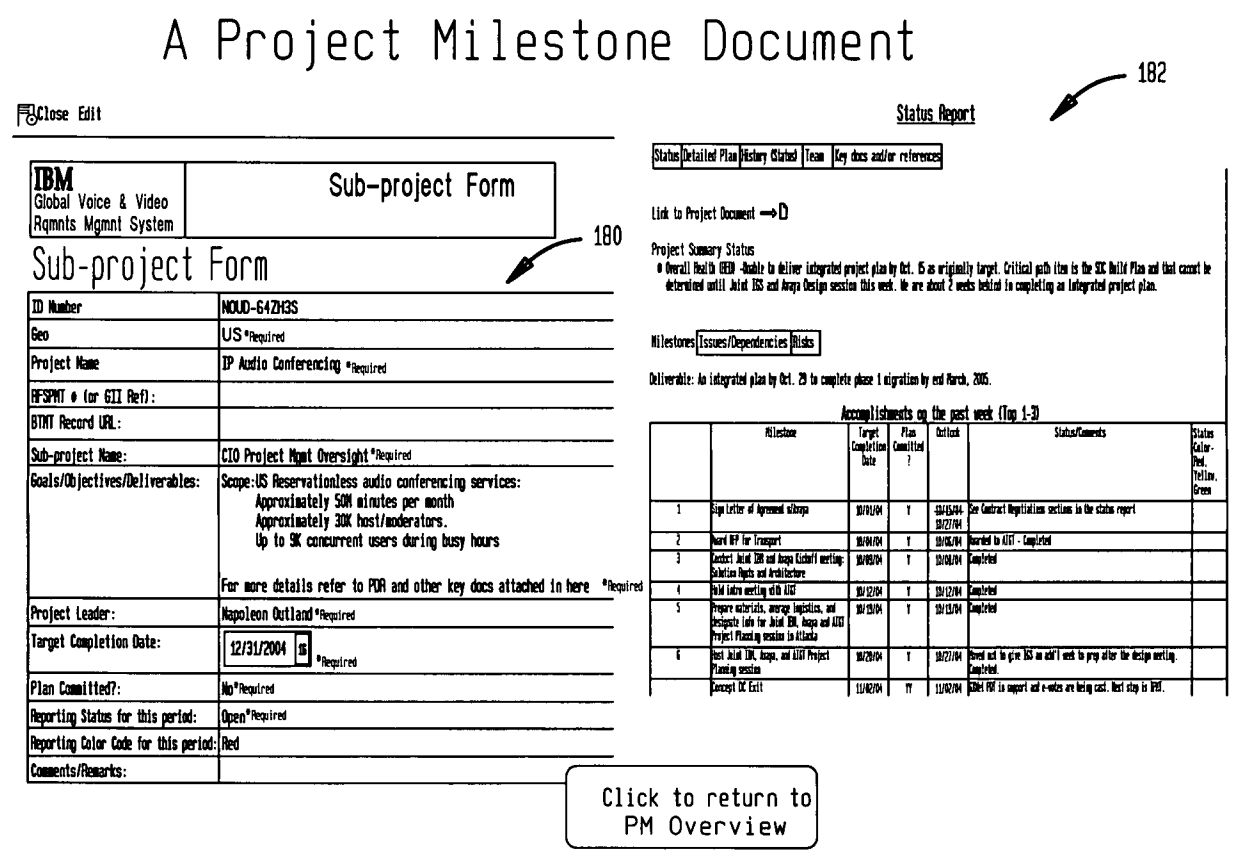

FIGS. 16-24 illustrate display screens that may be shown during the Project Management engagement Process. In particular, FIG. 16 shows a screen that is used to gain access to the other screens. FIG. 17 shows a screen that lists at 170 the milestones in a particular project; and, for each of these milestones, a sub-project, a project leader 172, and the status 176 of the milestone are identified. FIG. 18 shows a particular project milestone document, and the document identifies a sub-project of the milestone, information 180 about that subproject, and a status report 182.

Figure 19:
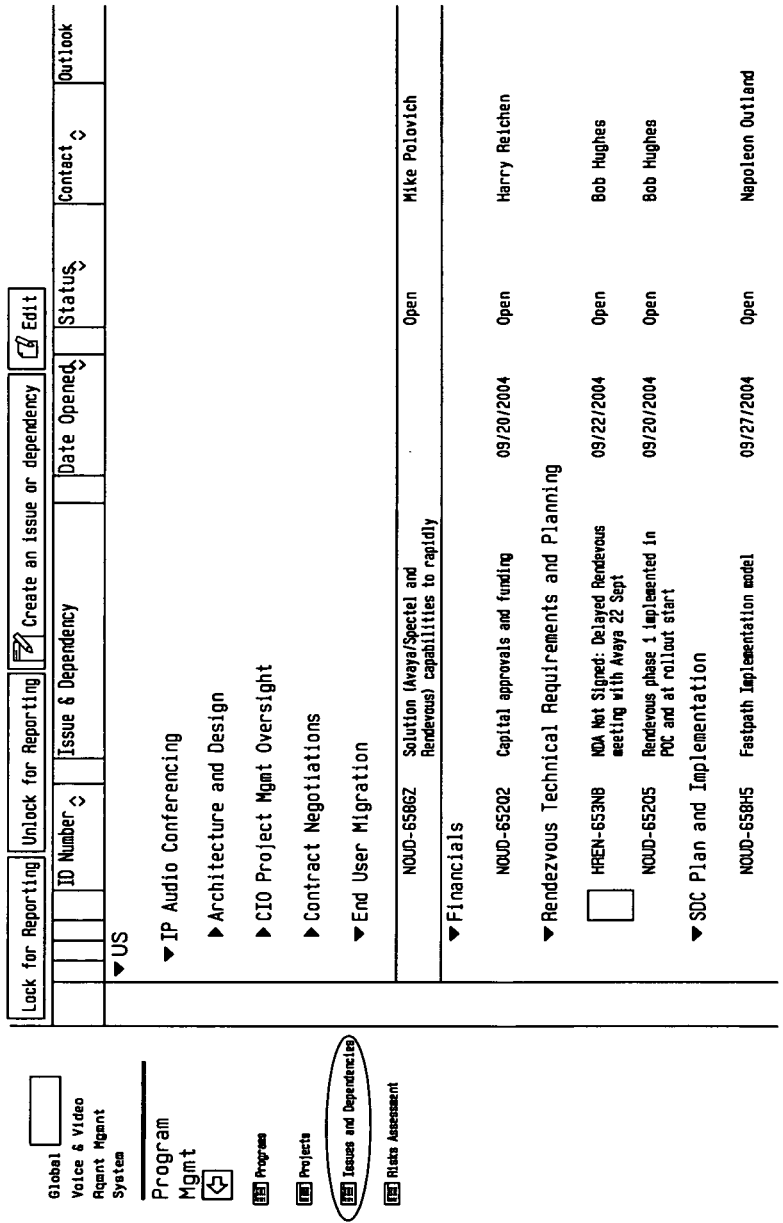
Figure 21:
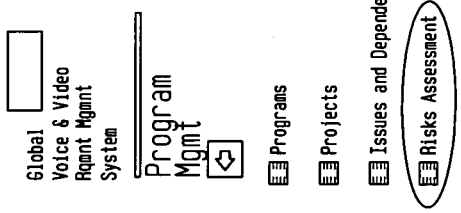

FIG. 19 shows an Issues and Dependencies View, and FIG. 20 shows an Issues or Dependency Document. These views are used to identify and to describe issues and dependencies associated with a project or sub-project, and both of these views may be used to add, delete and edit information shown in the views. FIG. 21 illustrates a Risks Management View, and FIG. 22 shows a Risk Document. These views are used to identify specific risk factors associated with a project or subproject, and to hold information about those risk factors. Both of these views also may be used to add, delete and edit information shown in the views.

As mentioned above, the Program Management Engagement Process performs various reporting functions, and, for example, FIG. 23 shows an Executive Summary Report that may be prepared by this process. FIG. 24 is an example of another type of report that can be prepared. This report, specifically a status report on a project to implement a LAN, provides a section 240 to list the major milestones of the project and another section 242 to list the issues and dependencies of the project. This report is, preferably, automatically generated by the Program Management Engagement Process from the data supplied to that process, and the report provides a clear and succinct, yet very informative, report on the project.

Figure 25:
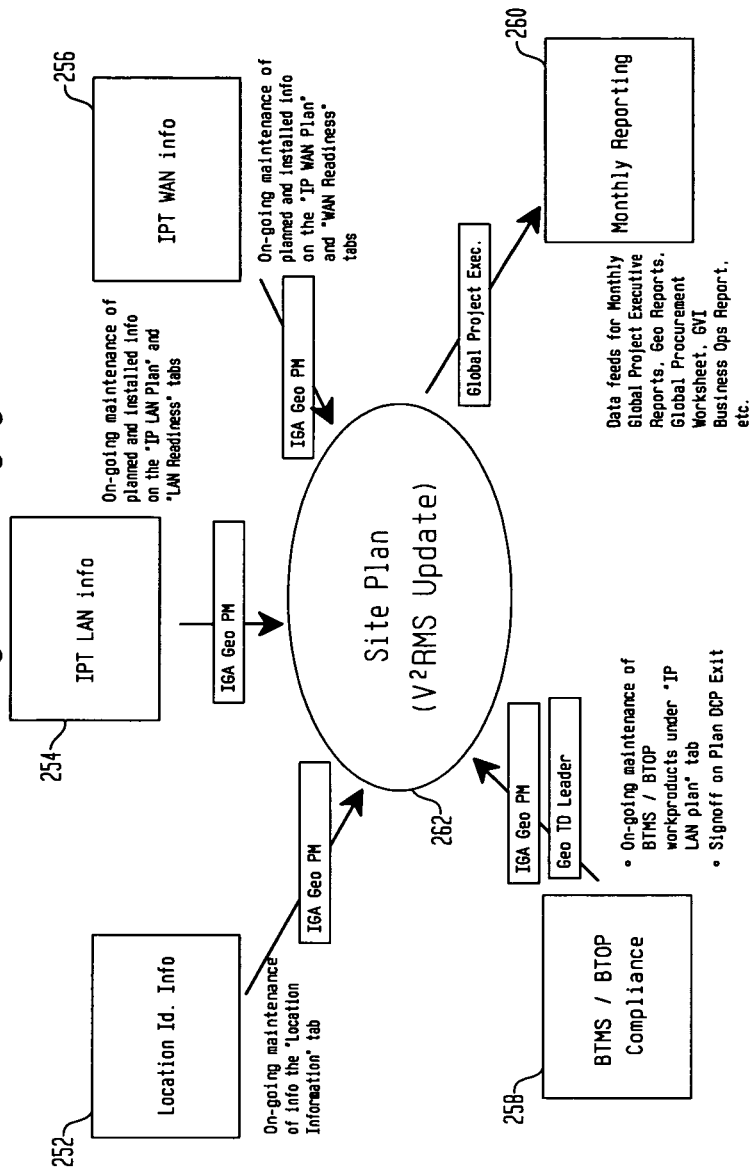
FIG. 25 generally illustrates the Transformation Management Engagement Process of V2RMS.

FIG. 25 generally illustrates the Transformation Management Engagement Process. Generally, this Process includes five sub-processes, referred to as Location id information 252, IPT LAN information 254, IPT WAN information 256, BTMS/BTOP compliance 258, and Monthly Reporting 260. The Location id information sub-process 252 is used to provide on-going maintenance of location information. The IPT LAN information sub-process 254 is used to provide on-going maintenance of planned and installed information on a specified LAN, and, similarly, the IPT WAN information sub-process 256 is used to provide on-going maintenance of planned and installed information on a specified WAN. The BTMS/BTOP compliance sub-process 258 is used to provide on-going maintenance of the BTMS/BTOP work products.

Information from the Location id information, the OPT LAN information, the IPT WAN information, and the BTMS/BTOP compliance sup-processes is supplied to a site plan 262, which uses this information to generate monthly reports 260. These reports may include, for instance, monthly global project executive reports, geo reports, a global procurement worksheet, and a GVI business operations report.

FIGS. 26-34 show screens that may be displayed during the Transformation Management Engagement Process.

Figure 26:
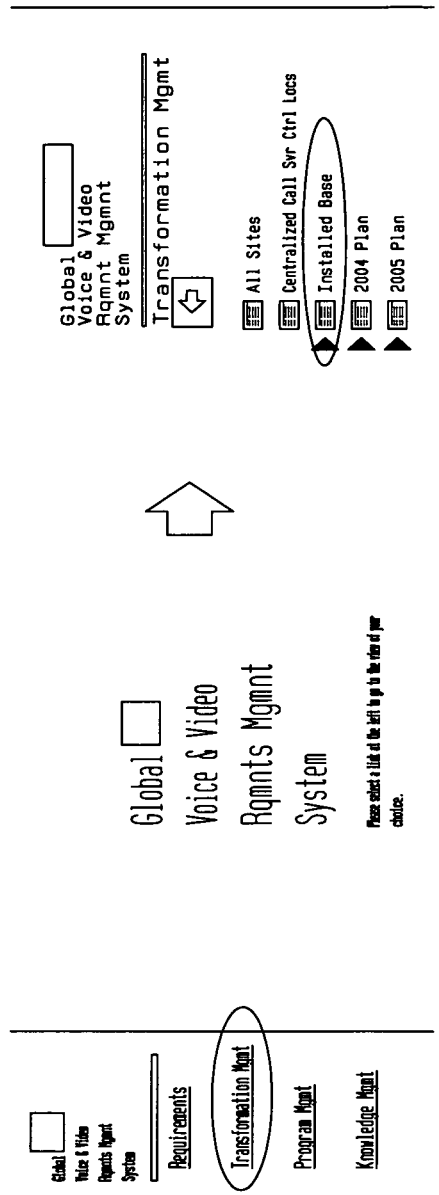
Figure 27:
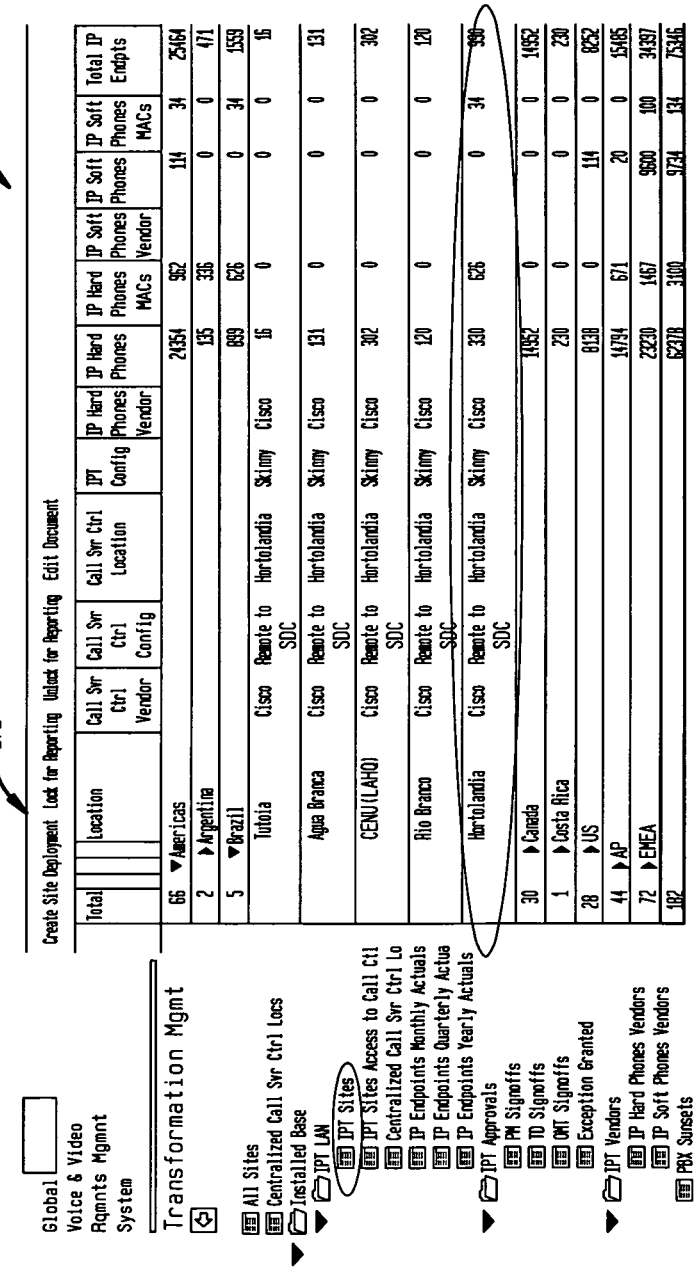

FIG. 26 shows a first screen that is used to access other screens in this Process, and FIG. 27 illustrates a Transformation Summary Report. This Report is a summary of information about an IP transformation, and identifies various specific locations, and contains information about servers at those locations.

FIGS. 28-35 show a detailed Transformation Report. More specifically, FIG. 28 contains information about a specific location, including the number of servers at the site, and the business units at the site. FIG. 29 lists information about a particular call server control, including, for example, the planned and the installed IP telephony configuration, the planned and installed call server control vendor, and the planned and installed call server configuration.

FIG. 30 shows information about an IP endpoint, including, for instance, the planned and installed IP hard phones vendor, and the planned and installed number of IP hard phones on LAN. This Figure also shows the planned and installed IP soft phones vendor, and the planned and installed number of OP soft phones on LAN.

FIG. 31 shows a screen that provides information about the legacy system being replaced. In particular, this screen shows elements of the replacement plan, referred to as the sunset legacy plan, including the planned and actual dates of completion of the replacement plan. In addition, this Figure shows the status of the transformation plan.

FIG. 32 shows a document that identifies BTMS/BTOP work products, and acts as a checklist to ensure that various documents, if needed, are prepared. FIG. 33 shows a document that is used by several individual to "sign off," indicating that various aspects of the transformation have been approved.

FIG. 34 illustrates a yearly report. This particular Report shows information about an IP transformation process in Denmark. The Report identifies specific cities, indicates the status of the transformation in each of those cities, and gives other data such as the number of EP hard phones and total IP endpoint in each of those cities.

FIGS. 26-34 show screens that may be displayed during the Transformation Management Engagement Process.

As will be understood by those of ordinary skill in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A computer-implemented method of providing a view of a transformation program to facilitate full team participation in information technology investment and return on investment planning, execution, monitoring and reporting, the method comprising the steps of:

providing, at a computer system, an integrated and end-to-end set of processes, analytic tools, and reports that provide an information technology team with a comprehensive view of an information technology transformation, said processes including a requirements management process, a program management process, a transformation management process, and a knowledge management process; and using, by said computer system, said set of processes, analytic tools and reports to provide a visibility to make objective business decisions about issues, including technology and activity and resource allocation, including using a first group of the analytic tools to generate upstream data, using a second group of the analytic tools to manage the information technology transformation, using, by said computer system, one of the analytic tools, functionally between said first and second groups of the analytic tools, to compile and analyze the upstream data generated by the first group of the analytic tools, and to make the compiled and analyzed upstream data available to the second group of the analytic tools, showing, by said computer system, a display screen to define a solution to a requirement, including assigning the requirement to a resource shown on the display screen, said resource developing and maintaining an action plan to monitor and report progress of on-going activities while investigating a solution that meets the requirement, and showing on the display screen a group of screens illustrating aspects of the transformation management process including a transmission report, said group of screens including a first screen containing information about a specific location including a number of servers at the location, a second screen listing information about a specified call server control, a third screen showing information about a specified endpoint, and a fourth screen used to access others of the screens in the transformation management process;

using a computer system, executing at least one of the analytic tools, to generate at least a part of the comprehensive view; and wherein:

the second group of analytic tools includes a Technology Deployment Lead using said one of the analytic tools to align geo plans with a global strategy, to provide oversight and direction to a global account, and to ensure user input is prioritized;

the transformation management process includes a location ID information sub-process, an Internet Protocol Telephony Local Area Network (IPT LAN) information sub-process, an Internet Protocol Telephony Wide Area Network (IPT WAN) information sub-process, and a Business Transformation Management System/Business Transformation Operation Process (BTMS/BTOP) compliance sub-process;

the location ID information sub-process is used to provide on-going maintenance of local information;

the IPT LAN information sub-process is used to provide on-going maintenance of planned and installed information on a specified LAN;

the IPT WAN information sub-process is used to provide on-going maintenance of planned and installed information on a specified WAN; and the BTMS/BTOP compliance sub-process is used to provide on-going maintenance of BTMS/BTOP work products.

2. A method according to claim 1, wherein the using step includes the steps of:

submitting a requirement;

qualifying said requirement and assigning said requirement to a best available resource;

said best available resource researching said requirement and recommending a solution;

reviewing said solution, and either approving or rejecting said solution;

if said solution is approved, submitting said solution to an Account Group; and said Account Group developing a ROM.

3. A method according to claim 2, wherein:

the step of submitting said requirement includes the steps of preparing a specified form describing said requirement; and sending said form to an Operations Management Team; and the qualifying step includes the step of said Operations Management Team qualifying said requirement and assigning said requirement to said best available resource.

4. A method according to claim 3, wherein:

the step of said best available resource researching said requirement and recommending a solution includes the step of said best available resource sending said solution to the Operations Management Team; and the step of reviewing said solution includes the step of said Operations Management Team reviewing said solution.

5. A method according to claim 4, wherein the using step includes the further steps of:

collecting information describing Project Milestones, Risks Management, and Issues and Dependencies; and preparing regular reports, in defined formats, using said information.

6. The method according to claim 1, wherein:

the step of using said set of processes further includes providing templates and accessing the templates while investigating said solution to help develop the action plan;

said set of processes includes an Issues Dependencies to identify issues and dependencies that require a global team involvement; and said comprehensive view includes an Issues and Dependencies view to describe issues and dependencies associated with a project of the information technology transformation.

7. The method according to claim 1, wherein:

the requirements management process is used to consolidate requirements, to assign assets, and to define solutions;

the program management process is used for services engagement, BTOP control compliance, and executive reporting;

the transformation management process is used for geo planning, site network readiness and global collaboration; and the knowledge management process provides instructions, templates, and retained information;

the program management process includes a project milestone sub-process, a risks management sub-process, and an issues dependencies sub-process:

the project milestone sub-process creates and maintains high-level milestones extracted from an integrated project plan;

the risks management sub-process identifies high-level risks that require a global team involvement;

the issues dependencies sub-process identifies high-level issues that require the global team involvement;

a list of the milestones is shown; and for each of the milestones, a sub-project, a project leader, and a status of the milestone are identified, and the issues dependencies sub-process provides a view identifying and describing issues and dependencies associated with a project or one of the sub-projects.

8. The method according to claim 1, wherein a Systems Project Manager uses said one of the analytic tools to achieve contracts for systems development and deployment to meet geo transformation commitments, and to monitor and report status and metrics of geo projects.

9. A program storage device readable by machine, tangibly embodying a program of instructions executable by the machine to perform method steps for providing a view of a transformation program to facilitate full team participation in information technology investment and return on investment planning, execution, monitoring and reporting, the method steps comprising:

providing, at a computer system, an integrated and end-to-end set of processes, analytic tools, and reports that provide an information technology team with a comprehensive view of an information technology transformation, said processes including a requirements management process, a program management process, a transformation management process, and a knowledge management process; and using, by said computer system, said set of processes, analytic tools and reports to provide a visibility to make objective business decisions about issues, including technology and activity and resource allocation, including using a first group of the analytic tools to generate upstream data, using a second group of the analytic tools to manage the information technology transformation, using, by said computer system, one of the analytic tools, functionally between said first and second groups of the analytic tools, to compile and analyze the upstream data generated by the first group of the analytic tools, and to make the compiled and analyzed upstream data available to the second group of the analytic tools, showing, by said computer system, a display screen to define a solution to a requirement, including assigning the requirement to a resource shown on the display screen, said resource developing and maintaining an action plan to monitor and report progress of on-going activities while investigating a solution that meets the requirement, and showing on the display screen a group of screens illustrating aspects of the transformation management process including a transmission report, said group of screens including a first screen containing information about a specific location including a number of servers at the location, a second screen listing information about a specified call server control, a third screen showing information about a specified endpoint, and a fourth screen used to access others of the screens in the transformation management process; and wherein:

the second group of analytic tools includes a Technology Deployment Lead using said one of the analytic tools to align geo plans with a global strategy, to provide oversight and direction to a global account, and to ensure user input is prioritized;

the transformation management process includes a location ID information sub-process, an Internet Protocol Telephony Local Area Network (IPT LAN) information sub-process, an Internet Protocol Telephony Wide Area Network (IPT WAN) information sub-process, and a Business Transformation Management System/Business Transformation Operation Process (BTMS/BTOP) compliance sub-process;

the location ID information sub-process is used to provide on-going maintenance of local information;

the IPT LAN information sub-process is used to provide on-going maintenance of planned and installed information on a specified LAN;

the IPT WAN information sub-process is used to provide on-going maintenance of planned and installed information on a specified WAN; and the BTMS/BTOP compliance sub-process is used to provide on-going maintenance of BTMS/BTOP work products.

10. A program storage device according to claim 9, wherein the using step includes the steps of:

submitting a requirement;

qualifying said requirement and assigning said requirement to a best available resource;

said best available resource researching said requirement and recommending a solution;

reviewing said solution, and either approving or rejecting said solution;

if said solution is approved, submitting said solution to an Account Group; and said Account Group developing a ROM.

11. A program storage device according to claim 10, wherein:

the step of submitting said requirement includes the steps of preparing a specified form describing said requirement; and sending said form to an Operations Management Team;

the qualifying step includes the step of said Operations Management Team qualifying said requirement and assigning said requirement to said best available resource;

the step of said best available resource researching said requirement and recommending a solution includes the step of said best available resource sending said solution to the Operations Management Team; and the step of reviewing said solution includes the step of said Operations Management Team reviewing said solution.

12. A program storage device according to claim 11, wherein the using step includes the further steps of:

collecting information describing Project Milestones, Risks Management, and Issues and Dependencies; and preparing regular reports, in defined formats, using said information.

13. A method of deploying a computer program product for providing a view of a transformation program to facilitate full team participation in information technology investment and return on investment planning, execution, monitoring and reporting, comprising the step:

loading the computer program product on a computer system;

wherein when executed in said computer system, the computer program performs the steps of:

providing, at a computer system, an integrated and end-to-end set of processes, analytic tools, and reports that provide an information technology team with a comprehensive view of an information technology transformation, said processes including a requirements management process, a program management process, a transformation management process, and a knowledge management process; and using, by said computer system, said set of processes, analytic tools and reports to provide a visibility to make objective business decisions about issues, including technology and activity and resource allocation, including using a first group of the analytic tools to generate upstream data, using a second group of the analytic tools to manage the information technology transformation, using, by said computer system, one of the analytic tools, functionally between said first and second groups of the analytic tools, to compile and analyze the upstream data generated by the first group of the analytic tools, and to make the compiled and analyzed upstream data available to the second group of the analytic tools, showing, by said computer system, a display screen to define a solution to a requirement, including assigning the requirement to a resource shown on the display screen, said resource developing and maintaining an action plan to monitor and report progress of on-going activities while investigating a solution that meets the requirement, and showing on the display screen a group of screens illustrating aspects of the transformation management process including a transmission report, said group of screens including
a first screen containing information about a specific location including a number of servers at the location,
a second screen listing information about a specified call server control, and
a third screen showing information about a specified endpoint,
a fourth screen used to access others of the screens in the transformation management process;
and wherein:
the second group of analytic tools includes a Technology Deployment Lead using said one of the analytic tools to align geo plans with a global strategy, to provide oversight and direction to a global account, and to ensure user input is prioritized;
the transformation management process includes a location ID information sub-process, an Internet Protocol Telephony Local Area Network (IPT LAN) information sub-process, an Internet Protocol Telephony Wide Area Network (IPT WAN) information sub-process, and a Business Transformation Management System/Business Transformation Operation Process (BTMS/BTOP) compliance sub-process;
the location ID information sub-process is used to provide on-going maintenance of local information;
the IPT LAN information sub-process is used to provide on-going maintenance of planned and installed information on a specified LAN;
the IPT WAN information sub-process is used to provide on-going maintenance of planned and installed information on a specified WAN; and
the BTMS/BTOP compliance sub-process is used to provide on-going maintenance of BTMS/BTOP work products.

14. A method according to claim 13, wherein the using step includes the steps of:
submitting a requirement;
qualifying said requirement and assigning said requirement to a best available resource;
said best available resource researching said requirement and recommending a solution;
reviewing said solution, and either approving or rejecting said solution;
if said solution is approved, submitting said solution to an Account Group; and
said Account Group developing a ROM.

15. A method according to claim 14, wherein:
the step of submitting said requirement includes the steps of preparing a specified form describing said requirement; and sending said form to an Operations Management Team;
the qualifying step includes the step of said Operations Management Team qualifying said requirement and assigning said requirement to said best available resource;
the step of said best available resource researching said requirement and recommending a solution includes the step of said best available resource sending said solution to the Operations Management Team; and
the step of reviewing said solution includes the step of said Operations Management Team reviewing said solution.

16. A method according to claim 15, wherein the using step includes the further steps of:
collecting information describing Project Milestones, Risks Management, and Issues and Dependencies; and
preparing regular reports, in defined formats, using said information.

17. A system for providing a view of a transformation program to facilitate full team participation in information technology investment and return on investment planning, execution, monitoring and reporting, the system comprising:
a computer system for providing an integrated and end-to-end set of processes, analytic tools, and reports that provide an information technology team with a comprehensive view of an information technology transformation, said processes including a requirements management process, a program management process, a transformation management process, and a knowledge management process; and
the computer system for using said set of processes, analytic tools and reports to provide a visibility to make objective business decisions about issues, including technology and activity and resource allocation, including
using a first group of the analytic tools to generate upstream data,
using a second group of the analytic tools to manage the information technology transformation,
using one of the analytic tools, functionally between said first and second groups of the analytic tools, to compile and analyze the upstream data generated by the first group of the analytic tools, and to make the compiled and analyzed upstream data available to the second group of the analytic tools,
the computer system for showing a display screen to define a solution to a requirement, including assigning the requirement to a resource shown on the display screen, said resource developing and maintaining an action plan to monitor and report progress of on-going activities while investigating a solution that meets the requirement, and showing on the display screen a group of screens illustrating aspects of the transformation management process including a transmission report, said group of screens including
a first screen containing information about a specific location including a number of servers at the location,
a second screen listing information about a specified call server control,
a third screen showing information about a specified endpoint, and
a fourth screen used to access others of the screens in the transformation management process; and wherein:
the second group of analytic tools includes a Technology Deployment Lead using said one of the analytic tools to align geo plans with a global strategy, to provide oversight and direction to a global account, and to ensure user input is prioritized;
the transformation management process includes a location ID information sub-process, an Internet Protocol Telephony Local Area Network (IPT LAN) information sub-process, an Internet Protocol Telephony Wide Area Network (IPT WAN) information sub-process, and a Business Transformation Management System/Business Transformation Operation Process (BTMS/BTOP) compliance sub-process;
the location ID information sub-process is used to provide on-going maintenance of local information;

the IPT LAN information sub-process is used to provide on-going maintenance of planned and installed information on a specified LAN;

the IPT WAN information sub-process is used to provide on-going maintenance of planned and installed information on a specified WAN; and the BTMS/BTOP compliance sub-process is used to provide on-going maintenance of BTMS/BTOP work product.

18. A system according to claim 17, wherein said set of processes includes a first process for:

submitting a requirement;

qualifying said requirement and assigning said requirement to a best available resource;

researching said requirement and recommending a solution; and reviewing said solution, and either approving or rejecting said solution.

19. A system according to claim 18, wherein the set of processes includes a second process for:

collecting information describing Project Milestones, Risks Management, and Issues and Dependencies; and preparing regular reports, in defined formats, using said information.

20. A method for preparing and implementing an Annual Plan to facilitate full team participation in information technology investment and return on investment planning, execution, monitoring and reporting, the method comprising the steps of:

negotiating with a Project Development Team (PDT) about Information Technology (IT) and Return On Investment (ROI) for a given year;

said PDT collaborating with Service Providers to plan out a detail IT investment allocation and ROI forecasts in support of said annual Plan, said Plan articulating month-to-month investments and ROI targets;

technology deployment teams providing insight of how they will align with the Annual Plan;

in said given year, the PDT collaborating with said technology deployment teams on a regular basis to drive project executions in support of a global plan;

providing, at a computer system, an integrated and end-to-end set of processes, analytic tools, and reports that provide an information technology team with a comprehensive view of an information technology transformation, said processes including a requirements management process, a program management process, a transformation management process, and a knowledge management process; and using, by said computer system, said set of processes, analytic tools and reports to provide a visibility to make objective business decisions about issues, including technology and activity and resource allocation, including using a first group of the analytic tools to generate upstream data, using a second group of the analytic tools to manage the information technology transformation, using, by said computer system, one of the analytic tools, functionally between said first and second groups of the analytic tools, to compile and analyze the upstream data generated by the first group of the analytic tools, and to make the compiled and analyzed upstream data available to the second group of the analytic tools, showing, by said computer system, a display screen to define a solution to a requirement, including assigning the requirement to a resource shown on the display screen, said resource developing and maintaining an action plan to monitor and report progress of on-going activities while investigating a solution that meets the requirement, and showing on the display screen a group of screens illustrating aspects of the transformation management process including a transmission report, said group of screens including a first screen containing information about a specific location including a number of servers at the location, a second screen listing information about a specified call server control, a third screen showing information about a specified endpoint, and a fourth screen used to access others of the screens in the transformation management process;

using a computer system, executing at least one of the analytic tools, to generate at least a part of the comprehensive view; and wherein:

the second group of analytic tools includes a Technology Deployment Lead using said one of the analytic tools to align geo plans with a global strategy, to provide oversight and direction to a global account, and to ensure user input is prioritized;

the transformation management process includes a location ID information sub-process, an Internet Protocol Telephony Local Area Network (IPT LAN) information sub-process, an Internet Protocol Telephony Wide Area Network (IPT WAN) information, and a Business Transformation Management System/Business Transformation Operation Process (BTMS/BTOP) compliance sup-process;

the location ID information sub-process is used to provide on-going maintenance of local information;

the IPT LAN information sub-process is used to provide on-going maintenance of planned and installed information on a specified LAN;

the IPT WAN information sub-process is used to provide on-going maintenance of planned and installed information on a specified WAN; and the BTMS/BTOP compliance sub-process is used to provide on-going maintenance of BTMS/BTOP work products.

* * * * *